United States Patent [19]
Cameron et al.

[11] Patent Number: 5,619,109
[45] Date of Patent: Apr. 8, 1997

[54] METHOD AND CIRCUITRY FOR DRAG BRAKING A POLYPHASE DC MOTOR

[75] Inventors: Scott W. Cameron, Milpitas; Karl M. Schlager, Campbell, both of Calif.

[73] Assignee: SGS-Thomson Microelectronics, Inc., Carrollton, Tex.

[21] Appl. No.: 477,458

[22] Filed: Jun. 7, 1995

Related U.S. Application Data

[63] Continuation of Ser. No. 85,762, Jul. 1, 1993, Pat. No. 5,451,832.

[51] Int. Cl.$^6$ ........................................ H02P 3/10
[52] U.S. Cl. ...................... 318/375; 318/376; 318/254; 369/268
[58] Field of Search .................... 318/138, 254, 318/375, 376, 379, 439; 369/189, 239, 264, 266, 268

[56] References Cited

U.S. PATENT DOCUMENTS

| | | | |
|---|---|---|---|
| 4,085,355 | 4/1978 | Fradella | 318/168 |
| 4,127,799 | 11/1978 | Nakamura et al. | 318/373 |
| 4,779,260 | 10/1988 | Kaneko et al. | 369/266 |
| 4,782,272 | 11/1988 | Buckley et al. | 318/254 |
| 4,864,211 | 9/1989 | Kawaguchi | 318/626 |
| 5,010,283 | 4/1991 | Kitajima et al. | 318/373 |
| 5,012,166 | 4/1991 | Ushijima et al. | 318/254 |
| 5,172,036 | 12/1992 | Cameron | 318/138 |
| 5,221,881 | 6/1993 | Cameron | 318/254 |
| 5,250,883 | 10/1993 | Okada | 318/494 |

*Primary Examiner*—Bentsu Ro
*Attorney, Agent, or Firm*—Theodore E. Galanthay; Lisa K. Jorgenson; Renee M. Larson

[57] ABSTRACT

A method and circuit for braking a forward rotation of a rotor of a polyphase DC motor. A commutation sequencer is incremented by several phases to produce an incremented commutation sequence to produce a magnetic flux vector that lags a magnetic pole of the motor. Driving currents are applied to coils of the motor in accordance with the incremented commutation sequence to brake the rotor. The method is implemented in a circuit that has a sequencer for incrementally generating sets of commutation signals to select stator coils for energization to rotate the rotor. A power stage to which the commutation signals are applied energizes the selected coils in accordance with the commutation signals. A circuit interrupts the energization of the selected coils and the commutation sequence is altered to produce a sequence that produces a negative torque on the rotor. Circuits are also provided to inhibit application of the altered commutation sequence until recirculation currents in the power stage caused by the coils in response to the reduction of the input voltage have fallen below a predetermined level, and to inhibit application of the altered commutation sequence until a voltage on a sense resistor between the power stage and a reference potential has fallen below a predetermined level after an operation of the circuit for interrupting the energization of the selected coils.

22 Claims, 10 Drawing Sheets

BEGINNING OF PHASE | ROTATION THROUGH MAXIMUM TORQUE POSITION | END OF PHASE

METHOD AND CIRCUITRY FOR DRAG BRAKING A POLYPHASE DC MOTOR

The present application is a continuation of application Ser. No. 08/085,762, filed Jul. 1, 1993, now U.S. Pat. No. 5,451,832, issued Sep. 19, 1995.

BACKGROUND OF THE INVENTION

1. Field of the Invention

This invention relates to improvements in methods and circuitry for braking polyphase motors, and more particularly to improvements in methods and circuitry for creating a negative torque in a polyphase dc motor, and still more particularly in methods and circuitry for creating the negative torque on a spinning rotor of a polyphase dc motor in order to slow the rotor down quickly.

2. Description of the Prior Art

Although the present invention pertains to polyphase dc motors, in general, it finds particular application in conjunction with three phase dc motors, particularly of the brushless, sensorless type that are used for rotating data media, such as found in computer related applications, including hard disk drives, CD ROM drives, floppy disks, and the like. In computer applications, three phase brushless, sensorless dc motors are becoming more popular, due to their reliability, low weight, and accuracy.

Motors of this type can typically be thought of as having a stator with three coils connected in a "Y" configuration, although actually, a larger number of stator coils are usually employed with multiple motor poles. Typically, in such applications, eight pole motors are used having twelve stator windings and four N-S magnetic sets on the rotor, resulting in four electrical cycles per revolution of the rotor. The stator coils, however, can be analyzed in terms of three "Y" connected coils, connected in three sets of four coils, each physically separated by 90°.

In operation, the coils are energized in sequences in each of which a current path is established through two coils of the "Y", with the third coil left floating. The sequences are arranged so that as the current paths are changed, or commutated, one of the coils of the current path is switched to float, and the previously floating coil is switched into the current path. Moreover, the sequence is defined such that when the floating coils is switched into the current path, current will flow in the same direction in the coil which was included in the prior current path. In this manner, six commutation sequences are defined for each electrical cycle in a three phase motor.

In the past, polyphase dc motors were usually braked or stopped by two different methods. The first method is to tristate the stator coils so that no current flows through them. The rotor is allowed to spin freely and slows down due to frictional forces present in the motor. A second method is to connect all of the coils to a resistor that quickly dissipates the electromagnetic energy in the coils through the resistor. The rotor then stops more quickly than if just the frictional forces are used to slow the rotor down. These methods are relatively slow and are not controllable by the operator.

SUMMARY OF THE INVENTION

In light of the above, therefore, it is an object of the invention to provide an improved apparatus and method for braking a spinning rotor of a polyphase dc motor.

It is another object of the invention to provide an improved apparatus and method for drag braking a spinning rotor of a sensorless polyphase dc motor.

These and other objects, features and advantages of the invention will be apparent to those skilled in the art from the following detailed description of the invention, when read in conjunction with the accompanying drawings and appended claims.

In accordance with a broad aspect of the invention, a circuit is presented for operating a polyphase dc motor of the type having a plurality of "Y" connected stator coils and a moving rotor. Circuitry is provided for determining the actual instantaneous position of the rotor, and for determining a desired rotor position precedent to executing a desired commutation sequence. Circuitry is provided for executing the desired commutation sequence when the circuit for determining the actual instantaneous position of the rotor detects that the rotor is actually in the desired rotor position. Circuitry is provided, responsive to a predetermined negative torque signal for inhibiting drive signals to the driving coils, for initiating a drag braking routine to synchronize the position of the rotor to the desired commutation sequence, and for reapplying drive signals to the coils to form a negative torque on the rotor of the motor.

The circuitry for determining the actual instantaneous position of the rotor of the motor includes circuitry for receiving the back emf of at lest one coil prior to the desired commutation sequence, and circuitry for determining when the back emf received by the circuitry for receiving the back emf crosses zero from a predetermined direction. Circuitry is provided for measuring a delay after the back emf crosses zero from the predetermined direction to initiate a commutation, and, in addition, to enable mask circuitry to inhibit the back emf circuitry from determining when the back emf received by the circuitry for receiving the back emf crosses zero for a predetermined time after the commutation. For additional information on these circuits and how they control the polyphase dc motor can be found in U.S. Pat. No. 5,172,036, incorporated herein by reference.

In accordance with another broad aspect of the invention, a method for braking a polyphase dc motor having a plurality of driving coils and moving rotors is presented. The method includes the steps of initiating a braking sequence by first tristating the stator coils so that no energy is applied to them. Next, the recirculation currents are monitored until they become minimal. Finally, current is reapplied to the coils in a sequence that forms negative torque on the rotor. This negative torque may continue to be applied until the rotor is slowed to a desired speed, or finally stopped, if desired.

BRIEF DESCRIPTION OF THE DRAWINGS

The invention is illustrated in the accompanying drawings in which.

In the various figures of the drawings, like reference numerals are used to denote like or similar parts.

DETAILED DESCRIPTION OF THE PREFERRED EMBODIMENT

Figure 1A:
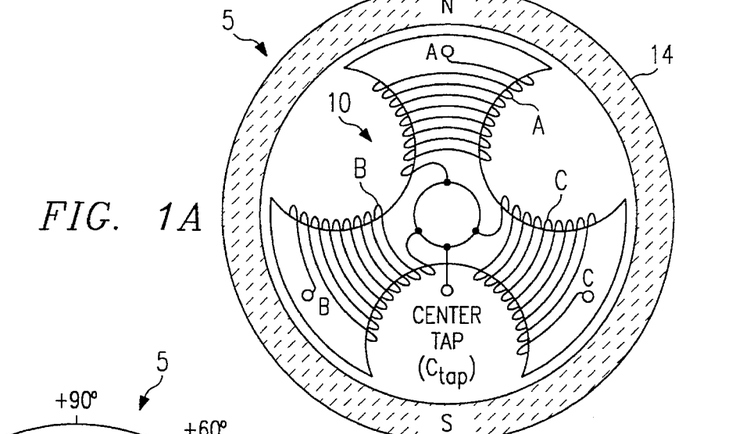
FIG. 1A shows a representation of one type of dc motor with a rotor and a stator with which the invention can be practiced.
Figure 1B:
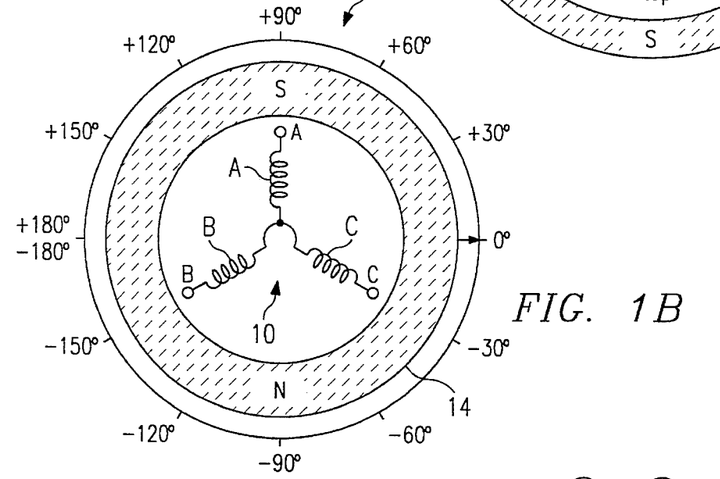
FIG. 1B shows an electrical shematic and physical representation of the motor of FIG. 1A, showing the angular and simiplified coil conventions used herein.

A three-phase brushless and sensorless dc motor 5 of the type with which the invention may be practiced is shown in FIGS. 1A and 1B. It should be noted that although a preferred embodiment of the invention is described with regard to a three phase motor, in particular, the principles of the invention can be equally advantageously applied to polyphase motors, in general. The motor 5 includes a stator 10 having at least three coils A, B, and C, and a rotor 14 having a north pole N and a south pole S.

Each of these coils A, B, and C is connected to a power stage 32 (see FIG. 6) that energizes two coils at a time and leave the third coil floating as below described in detail. As mentioned, although motors of this type can typically be thought of as having a stator with three coils connected in a "Y" configuration, actually, a larger number of stator coils are typically employed with multiple motor poles. For example, eight pole motors having twelve stator windings and four N-S magnetic sets on the rotor are commonly used.

Figure 2:
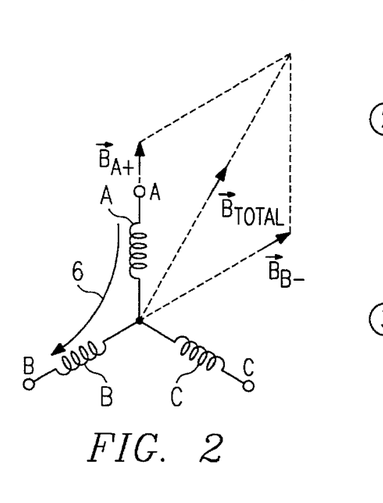
FIG. 2 shows a representation of a "Y" connected coil arrangement with current flowing through two coils to form flux vectors.
Figure 3:
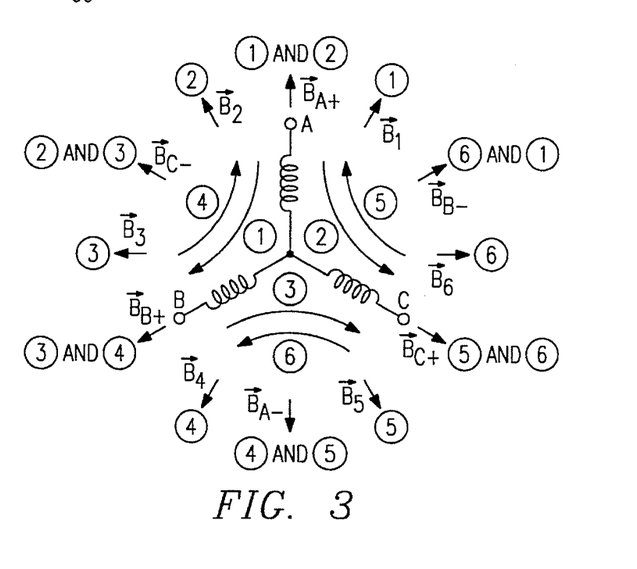
FIG. 3 shows a representation of a "Y" configured coil arrangement showing various flux formations and formed in different phases of the operation of the motor of FIG. 1.

The "Y" configured stator coils produce magnetic flux vectors, as schematically shown in FIG. 2. In the example of FIG. 2, a current 6 is flowing from node A to node B. The current in coils A and B causes a flux $\vec{B}_{total}$ to be produced, having vector components $\vec{B}_{A+}$ and $\vec{B}_{B-}$. The vector $\vec{B}_{total}$ produced represents the sum of the component vectors. As the current commutates from one node to another, the flux $\vec{B}_{total}$ also changes. Thus, as shown in FIG. 3, the flux directions for currents flowing in two coils in all the different directions produced by the various incremented commutation sequences can be represented by six vectors $\vec{B}_1$ to $\vec{B}_6$. In this configuration, there are six phases through which the energizing of coils will pass. Each of these phases is represented by the number shown next to the lines showing the direction of current flow through the various coils. For example, in phase 1, a current $I_1$ flows through coils A and B, and is represented by the current arrow 1. The flux formed in coil A and coil B combine form the total flux vector $\vec{B}_1$. Similar flux vectors are generated for each of the other commutation sequences in like manner.

Figure 4:
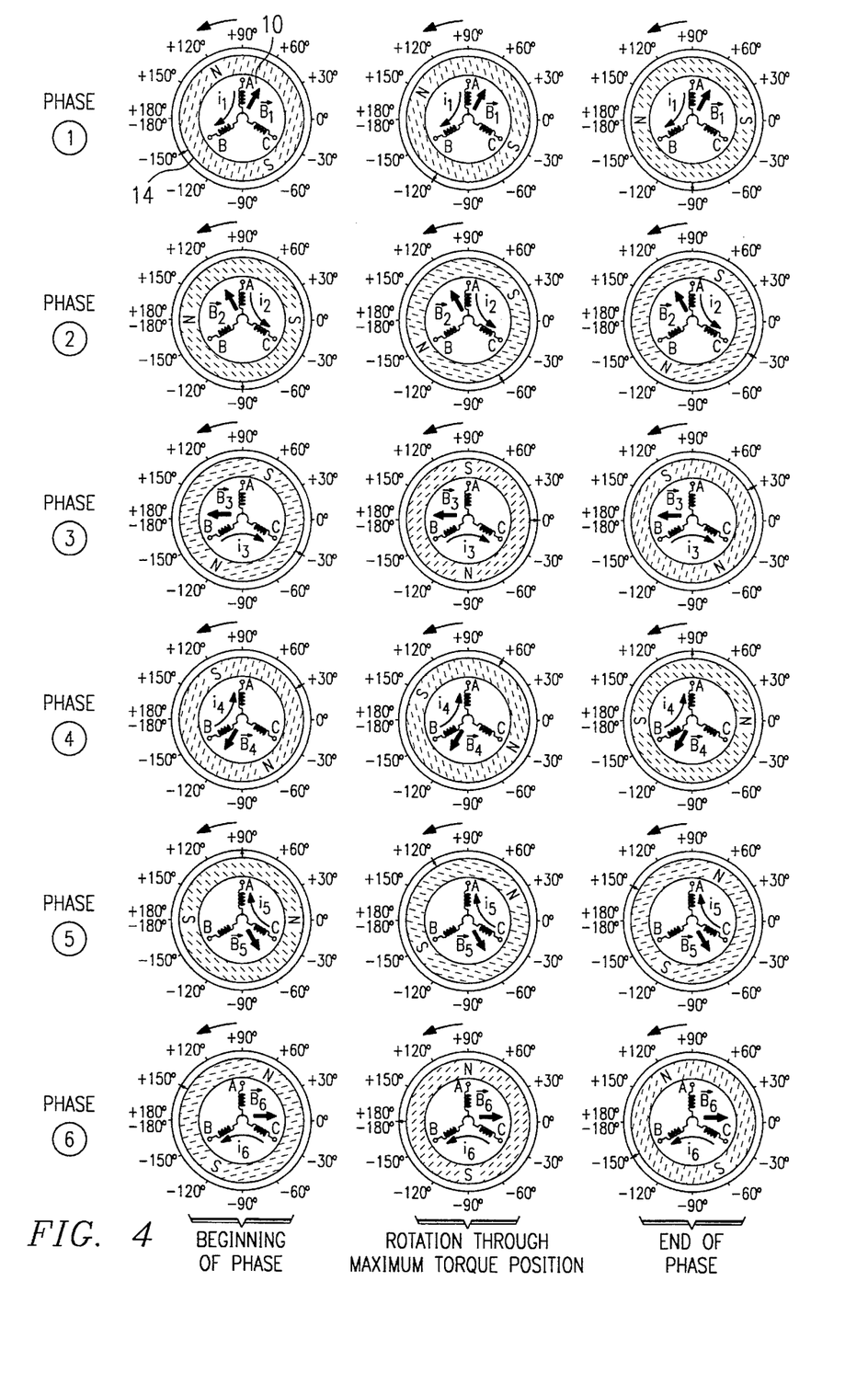
FIG. 4 shows the position of the rotor in various portions of each of the six phases through which a three-phase motor passes in a complete cycle.

In a three phase system, the forward rotating rotor positions throughout each of the six phases in relationship to the commutatively switched coil currents are shown in FIG. 4. The rotor and commutatively switched currents pass through each of the six phases 1–6 before the rotor completes one 360° rotation. More particularly, in FIG. 4, phase 1 is shown having a current flowing from node A to node B. This causes the flux $\vec{B}_1$ shown in the diagram. Phase 2 changes the current so that it flows from node A to node C. This causes the flux $\vec{B}_2$. Phase 3 changes the current so that it flows from node B to node C which causes the flux $\vec{B}_3$. Phase 4 changes the current so that it flows from node B to node A to form flux $\vec{B}_4$. Phase 5 changes the current so that it flows from node C to node A to form flux $\vec{B}_5$. The last phase 6 changes the current flow so that it flows from node C to node B to form flux $\vec{B}_6$.

Several generalizations are apparent from an examination of these diagrams. First, the currents flowing through the nodes A, B, and C are changed only one node at a time, and the node that is the same continues to conduct current and has the current flowing in the same direction. Second, the fluxes $\vec{B}_1$–$\vec{B}_6$ move counterclockwise in an orderly fashion. This is necessary for the motor to run smoothly. Third, in these drawings, the south pole of the rotor is maintained in an aligned relationship lagging the flux vector $\vec{B}$. This will happen if the current is kept constant as it is properly commutated from one phase to the next. Thus, as the motor operates, the south pole of the rotor follows the flux vector $\vec{B}$, which is changing direction to lead the south pole.

The various positions of the rotor with relation to the stator are shown at the beginning, midpoint and end of each phase in FIG. 4. With the south pole moving in a counter-clockwise direction towards flux vector $\vec{B}$, the flux lines of the rotor pass through the non-energized or floating coil. As the south pole gets closer to the centerline of the floating coil, more rotor flux lines pass through it, increasing the back emf (bemf) thereacross. For example, at the beginning of phase 1, the bemf is positive at node C (see FIG. 11). As the south pole continues moving toward the flux $\vec{B}_1$, the bemf in coil C increases but in a negative direction. Therefore, as the south pole of the rotor moves past the floating coil C, the bemf of coil C changes sign. This is referred to herein as a zero crossing. (ZC). This zero crossing is useful in determining the speed and direction of the rotor. It should be noted that the north pole produces a similar bemf in the coils, but in an opposite direction.

Figure 5:
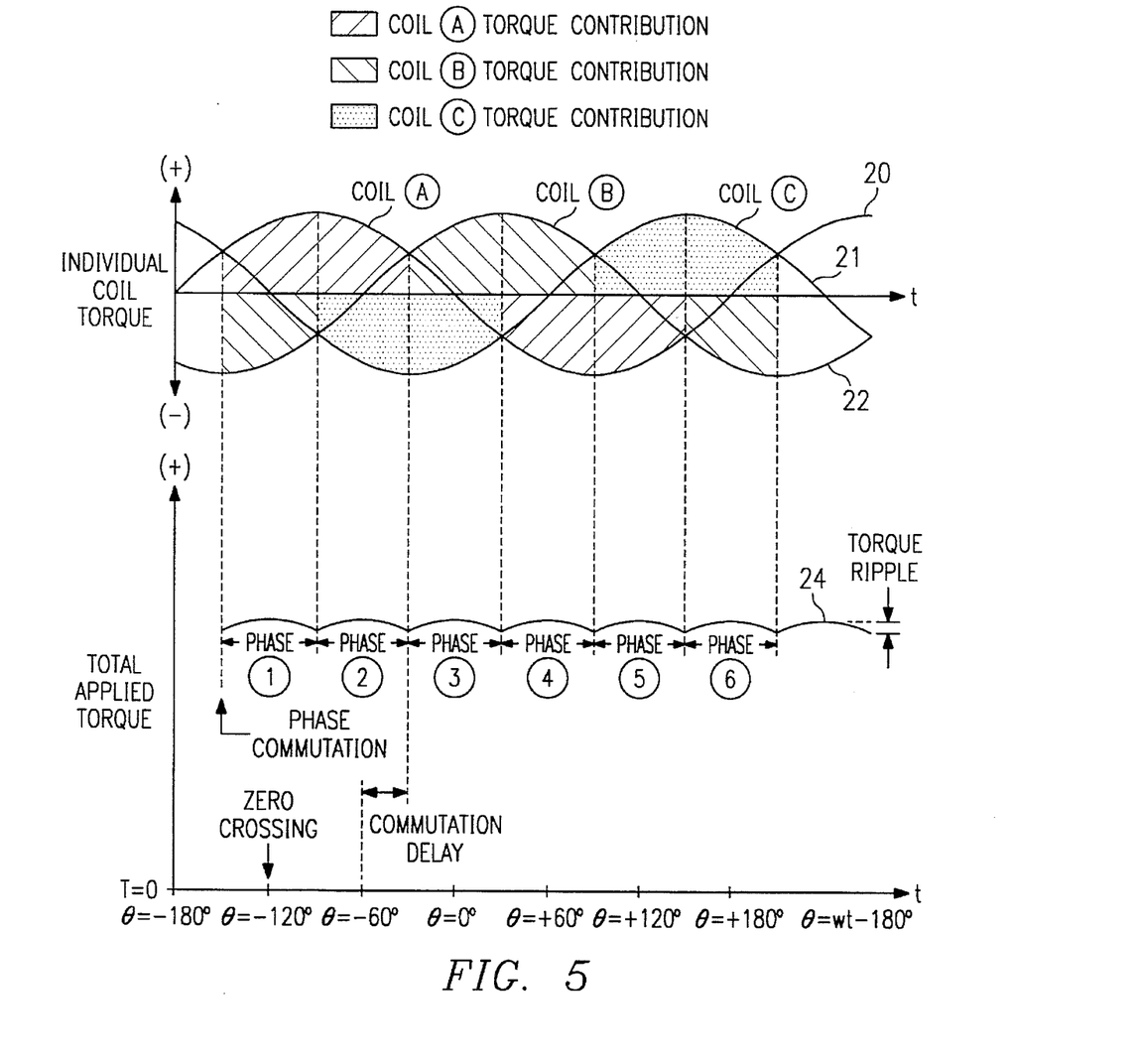
FIG. 5 shows a torque ripple diagram.

In a three phase system, the maximum torque is present substantially as the zero crossing of the bemf of the floating coil occurs. This is shown in FIG. 5 in which the torque contribution for each coil is shown by the graphs 20, 21, and 22, and the total torque shown by the graph 24. The torque contribution for coil A is represented by diagonal lines from lower left to upper right, and the torque for coil B is represented by diagonal lines from upper left to lower right. The torque contribution for coil C is represented by circles. These torques are added to form the torque ripple diagram at the bottom of the chart. Each phase has maximum torque at the zero crossing of the floating coil.

Thus, in phase 1, the south pole continues past node C as it heads for the flux vector $\vec{B}_1$. Just before the south pole reaches that the flux vector $\vec{B}_1$, however, phase 2 begins. In phase 2, the current is changed to flow from node A to node C which causes the flux vector $\vec{B}_1$ to disappear and flux vector $\vec{B}_2$ to form. Coil B now floats. The bemf in coil B is monitored to discover when the zero crossing occurs (this time the north pole will pass by node B). When the zero crossing occurs the timing of the next communication is initiated. The process is continued through all of the phases 1–6; and when the end of Phase 6 occurs, phase 1 is again begun to continue the cycle.

Figure 6:
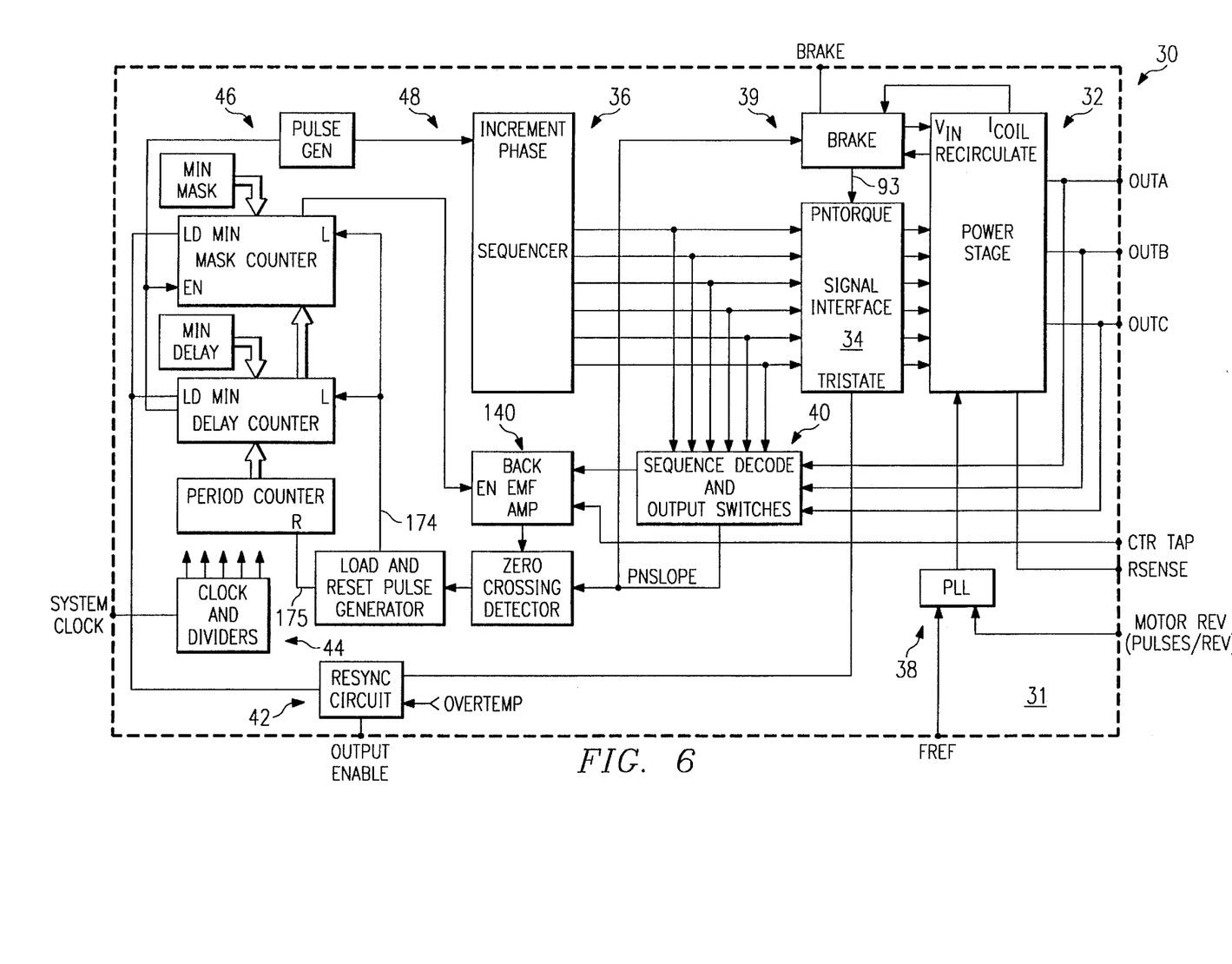
FIG. 6 shows an electrical schematic block diagram of a motor driver system incorporating apparatus according to preferred embodiments of the invention.

A portion of an electrical schematic block diagram of a motor controller 30 for a polyphase dc motor is shown in FIG. 6. Although the motor controller can be constructed of discrete components, preferably, the motor controller 30 is integrated onto a single semiconductor chip 31 adapted for connection to the stator coils of a three phase dc brushless motor. The coil windings of the motor represented in FIG. 1 can be connected to output terminals OUT A, OUT B, OUT C and CTR TAP.

A sequencer 36, described below in detail with reference to FIG. 7, produces commutation sequencing signals to accomplish the commutation phases described in FIG. 4 above. Thus, the sequencer 36 produces six signals which produce a commutation from one phase to the next. These signals are applied to a signal interface circuit 34 which either passes the signals directly to the power stage 32 or changes the signals so that a negative torque is produced to brake the rotor, as described below in detail. The commutation signals from the signal interface 34 are applied to the power stage 32, below described in detail with respect to FIG. 8. The power stage 32 converts the commutation signals through power switching devices, such as bipolar transistors, MOSFETs, or other appropriate devices known in the art to energize the stator coils A, B, and C.

In addition, the commutation signals produced by the sequencer 36 are applied to sequence decode circuitry 40. The sequence decode circuitry 40 also receives bemf signals from the three coils referenced to the center tap of the stator windings to find the actual zero crossings of the back emf of the floating coils. The zero crossings are then used to form load and result pulses for operation of the period, delay, and mask counters 46 for incrementing the sequencer and masking commutation noises, as described in the aforesaid U.S. Pat. No. 5,172,036. A phase lock loop (PLL) frequency/phase detector circuitry 38, provides signals to the power stage 32 to control the currents in the coils.

To provide a drag braking function, a brake circuit 39 is provided. The brake circuit 39, which serves to apply a negative torque to the rotor 14, is initiated by a "brake" signal (which can be an operator originated signal, or an error signal generated in response to an abnormal condition, such as overtemperature, excessive currents, or the like) and receives information for monitoring recirculation currents in the power stage 32 and coil currents in the stator windings. The brake circuit 39 also has an input to the power stage 32 to control the input voltage $V_{IN}$ to the transconductance loop, below described.

Figure 7:
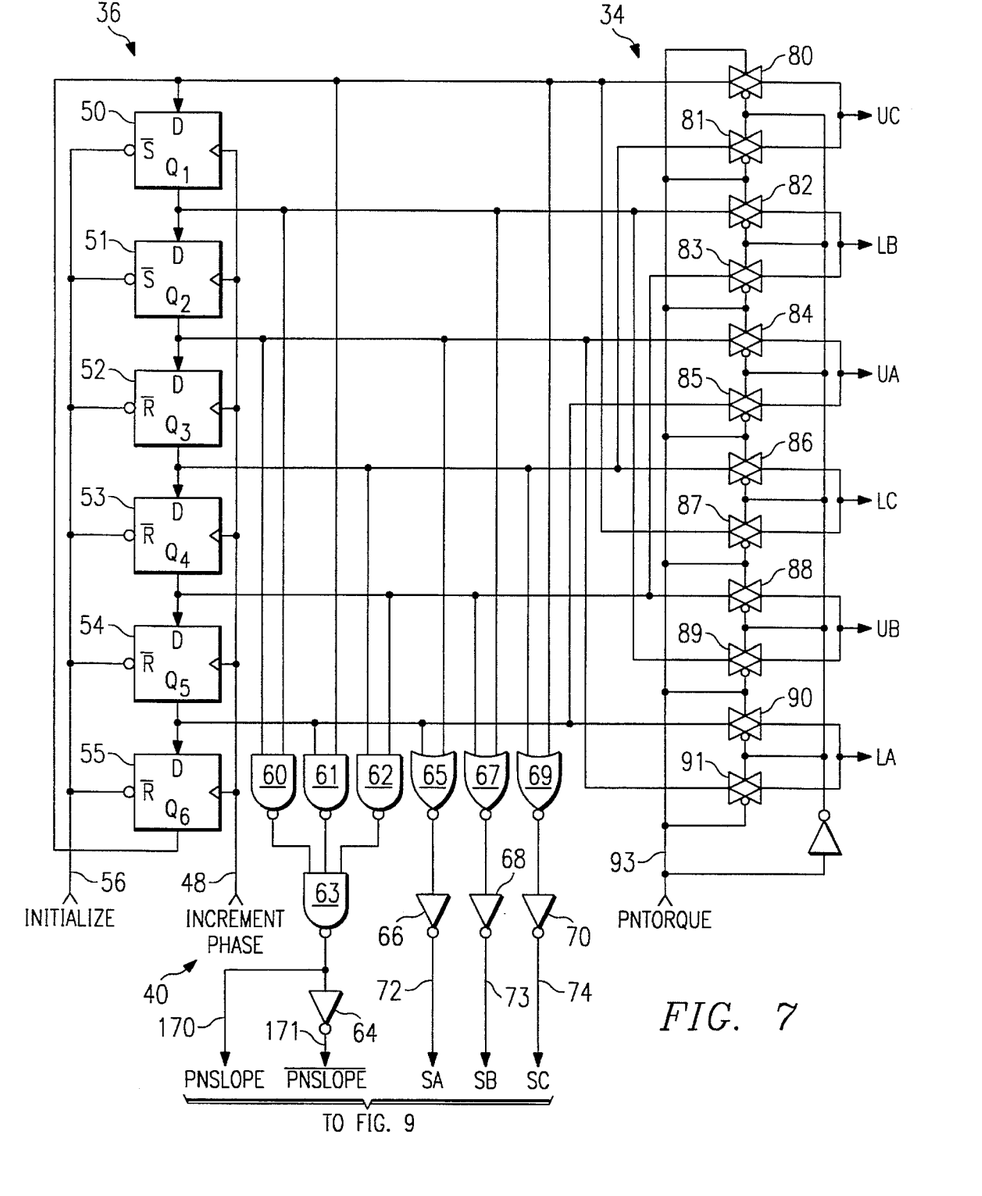
FIG. 7 shows an electrical schematic diagram of sequencer and signal interface circuits used in the motor driver system shown in FIG. 6.

The sequencer 36 and signal interface circuit 34 are shown in FIG. 7. The sequencer 36 is formed of a shift register, constructed, for example, by six D-type flip-flops 50–55. The output states $Q_1$–$Q_6$ of the respective D-type flip-flops 50–55 determine the states of the commutation signals on the specific upper and lower output lines that are activated at any particular instant. The flip flops 50–55 are initialized by a initialize signal applied on line 56. After being initialized, flip-flops 50 and 51 both have a logic "1" as an output while flip-flops 52–55 have a logic "0" as an output, to form the output sequence "110000". A signal on the line 48 successively increments the sequence from each commutation to the next to change the motor from one phase to the next. The incrementing signal is provided from the delay counter (see FIGS. 6 and 11) in response to the zero crossing detection described above. The two logic "1", or set states, in the commutation sequence initialized and circulated in the shift register of the sequencer 36, in combination with the particular interface circuit arrangement employed, serve to activate selected combinations of upper and lower driver transistors in the power stage 32, below described.

The sequence decoder 40 of the circuit of FIG. 7 includes NAND gates 60 through 63 and inverter 64 to form the "pnslope" signal on the line 170 and its complement on line 171. The "pnslope" signal is derived from the commutation signals of the sequencer 36 and therefore is not the actual slope of the bemf of the floating coils A, B, and C, but represents only the slope of the bemf that is next to produce a zero crossing. The NOR gates 65, 67 and 69 and the inverters 66, 68 and 70 produce a signal on lines 72–74 that identifies the expected floating coil that will produce the next zero crossing.

The signal interface 34 is also shown in FIG. 7. The signal interface circuit 34 includes 12 transmission gates 80–91 which receive the commutation signals from the sequencer 36 and transmit these signals to the power stage 32 depending on whether a signal, denoted "pntorque" on line 93 is positive or negative. The "pntorque" signal on line 93, indicating whether negative or positive torque is to be applied to the rotor 14, controls the transmission gates 80–91 by activating and deactivating the transmission gates depending on whether the "pntorque" signal is a logic 1 or a logic 0, to vary the order that the commutation signals are applied to the switches of the power stage 32. The six signals that are outputted from output terminals uC, lB, uA, lC, uB, and lA of the signal interface circuit 34 are then applied to the power stage 32 next described. (The designations uC, lB, uA, lC, uB, and lA designate the upper "u" or lower "l" power switches driving coils A, B, or C of the power stage 32).

Figure 8:
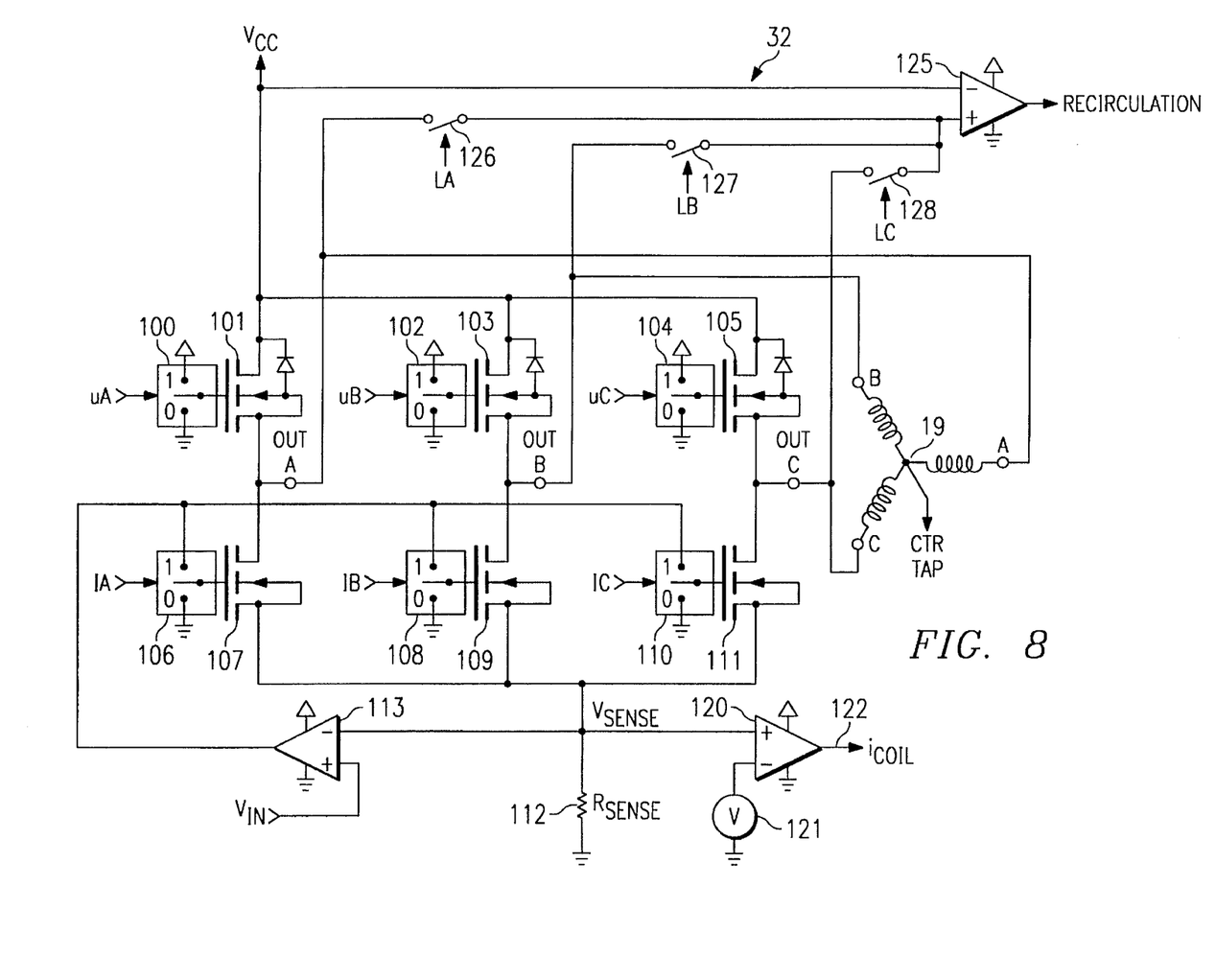
FIG. 8 shows an electrical schematic diagram of a power stage in accordance with the invention used in the motor driver system shown in FIG. 6.

The power stage 32 of the motor control circuitry 30 is a conventional H-bridge, commonly referred to as a triple ½-H-bridge, and is shown in FIG. 8. The "Y" connected stator windings A, B, and C are also shown in FIG. 8 connected to selectively receive the switched driving currents delivered by the power stage 32 of the motor control circuitry 30. The signals uA, uB, and uC are connected to control power switches 100, 102 and 104 respectively.

When a high state, or logic "one," is applied to the commutation switches 100, 102, and 104, the switches connect the gates of the MOSFETs 101, 103, and 105 respectively to turn on the respective MOSFWETs. When a low commutation state is applied, the switches connect the gates of their respective MOSFETs to a reference voltage, or ground, to turn off the associated MOSFETs. Similarly, the signals lA, lB, and lC control the respective lower driver switches 106, 108, and 110. A logic "one" state applied to one of the switches 106, 108, or 110, operates the switch to connect the output of the operational amplifier 113 to the gates of the respective MOSFET switching transistor 107, 109, or 111. The operational amplifier 113 provides a voltage at its output that represents the difference in the input voltage $V_{IM}$ and the voltage across the external sense resistor 112. On the other hand, a logic "zero" state applied to the switches 106, 108, or 110 causes the switches to connect the respective bases of MOSFET devices 107, 109 or 111 to an external reference potential, or ground. The transistors 101, 103, 105, 107, 109, and 111 can be of known power FETs, MOSFETs, bipolar transistors, or other switch devices, as desired.

As shown in FIG. 8, one end of each of the stator coils A, B, and C is connected together at a common center tap 19, the other ends being connected to respective nodes OUT A, OUT B, and OUT C between respective pairs of switching transistors 101–107, 103–109, and 105–111.

In operation, during an energized phase, one node (for example, node OUT A) is driven high by one of the upper switches, for instance switch 100 and its associated MOSFET 101. One node (for example, node OUT B) is driven low by one of the lower switches, such as switch 108 and its associated MOSFET 109. The other node (for example, node C) is left floating with both switches 104 and 110 off. This is commonly referred to as the "AB phase", and is shown as phase 1 in FIG. 4 described above. The coils are then switched in a commutation sequence determined by the sequence circuit 36 in a manner such that in each commutation phase current always flows in two of the three coils, with the third coil floating, so that after switching current will continue to flow in the same direction in one of the two coils in which current was flowing in the previous phase. More particularly, as shown in the diagram of FIG. 3, in a three phase motor, six operational phases exist. The current flows in each of these six phases as shown in the following Table A:

TABLE A

| Phase | Current flows | | Floating Coil | zero crossing slope |
|---|---|---|---|---|
| | From | To | | |
| 1 | A | B | C | − |
| 2 | A | C | B | + |
| 3 | B | C | A | − |
| 4 | B | A | C | + |
| 5 | C | A | B | − |
| 6 | C | B | A | + |

The switching of the driver transistors of the power stage 32 to effect the switching currents for each phase is accomplished by the sequencer circuit 36, described above with respect to FIG. 7, which provides signals to the upper driver outputs uA, uB, and uC and the lower driver outputs lA, lB, and lC, to accomplish the switching sequence outlined above in Table A.

A comparator 120 is also connected across the sense resistor 112 to compare the voltage across the sense resistor 112 with a reference voltage 121. The output on line 122 represents the coil current, which may be used in braking the motor, as below described in detail. Additionally, a comparator 125 is provided, switchably connected by switches 126, 127, and 128 to respective nodes A, B, and C to compare the voltage on nodes A, B, and C to the supply voltage, $V_{cc}$. The switches 126, 127, and 128 are operated by the lA, lB, and lC signals, so that the output on line 129 represents the recirculation current that exists in the circuit 32, as below described.

Figures 9, 10:
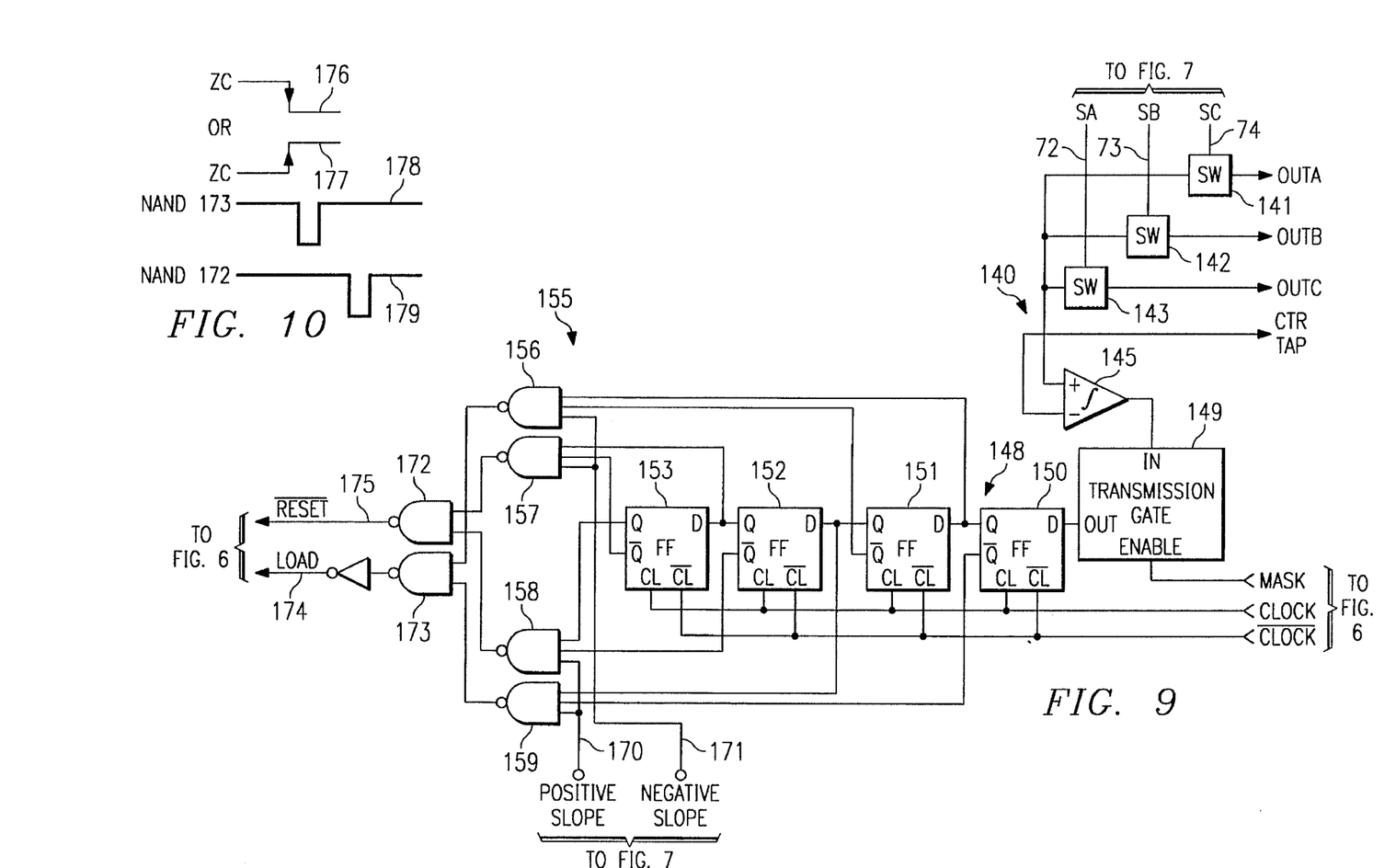
FIG. 9 shows an electrical schematic diagram of back emf amplifier and zero crossing detector circuits used in the motor driver system shown in FIG. 6.
FIG. 10 shows graphs of the zero crossing waveforms and NAND gate outputs seen in the circuits of FIG. 9.

With reference now to FIG. 9, the commutation among the coils A, B, and C is performed in response to information indicating the specific position of the rotor of the motor in conjunction with circuit information indicating the desired position of the rotor. More specifically, the commutation to apply the next drive sequence of Table A is determined in response to one of the floating coils reaching a particular rotational position and its correlation with sequencer information indicating where the motor should be when a commutation is to occur. The determination of the actual rotational location of the rotor is continuously being determined by monitoring the zero crossing voltage in each non-driven, or floating, coil. More particularly, as the coils A, B, and C are switched during the commutation sequence of the rotor, the voltage of the floating coil is monitored by the back emf amplifier circuit 140 shown in FIG. 9.

The back emf amplifier circuit 140 includes switches 141, 142, and 143 respectively connected to the motor driver outputs OUT A, OUT B, and OUT C, (see FIG. 8) to apply a selected one of outputs OUT A, OUT B, or OUT C to the non-inverting input of a comparator 145. The particular one of the motor driver outputs OUT A, OUT B or OUT C which is applied to the comparator 145 corresponds to whichever of coils A, B, or C that is expected to be floating (not necessarily the coil that is actually floating). Although the term "floating" is used herein to indicate the coil that is not in the instantaneous current path, the coil does not actually "float", but is connected to a tristate impedance. The switches 141, 142, and 143 are operated by the signals on lines 72, 73, and 74 from the sequencer 36, shown in FIG. 7 to effect the switching of the coil expected to be floating, as just described.

The center tap connection of the rotor is connected to the inverting input of the comparator 145, so that when the voltage on the selected floating coil becomes larger than the center tap voltage, the comparator 145 produces an output, representing the zero voltage crossing of the voltage on the selected floating coil. (The voltage which is applied to the input to the comparator 145 is the so-called "back emf" of the coil, the voltage generated in the selected coil as it moves through the magnetic field within the motor produced by the stator of the motor.) The comparator 145 is designed to have hysteresis, because the occurrence of a voltage beyond the zero crossing voltage may not last a sufficiently long time to enable the output signal of the comparator 145 to be useful. Also, the comparator 145 may include a voltage offset, if desired, to provide a bias to detect the zero crossings at a voltage before or after the actual zero crossing.

The output from the comparator 145 is connected to a shift register 148 through a transmission gate 149. The mask signal generated by the mask counter (see FIG. 6) is applied to an enable input of the transmission gate 149 so that the output from the comparator 145 is inhibited from being applied to the shift register 148 during the mask period following a phase commutation of the sequencer circuit 36. When, however, the output signal from the comparator 145 is enabled to pass the transmission gate 149, it is applied to the D input of the first of four D-type flip flops 150, 151, 152, and 153 comprising the shift register 148.

The various outputs of the flip flops 150, 151, 152, and 153 are connected to the output logic circuit 155, which includes NAND gates 156, 157, 158, and 159. Each of the flip flops 150, 151, 152, and 153 receive a clock input, for example from the system clock, and each produces an inverted ($\bar{Q}$) and non-inverted (Q) output. The Q outputs of flip flops 150, 151, and 152 are applied to the D input of the respective next stage flip flops, and the Q output of the last stage flip flop 153, is connected to NAND gate 158 of the output logic circuit 155.

The Q outputs of the flip flops 150 and 152 are connected to inputs of the upper NAND gates 156 and 157, respectively, while the Q outputs of the flip flops 151 and 153 are connected to the inputs of the lower NAND gates 159 and 158, respectively. On the other hand, the $\overline{Q}$ outputs of flip flops 150 and 152 are connected to inputs of the lower NAND gates 159 and 158, respectively, while the $\overline{Q}$ outputs of flip flops 151 and 153 are connected to inputs of the upper NAND gates 156 and 157, respectively.

Also, expected slope line 170 corresponding to an expected positive-to-negative going zero crossing slope carrying the signal referred to herein as "pnslope" is connected to inputs of NAND gates 156 and 157, and expected slope line 171 corresponding to an expected negative-to-positive going zero crossing slope is connected to inputs of NAND gates 158 and 159. The signals on lines 170 and 171 which indicate the direction of the expected zero crossing are generated from the phase information developed in the circuit 40 of FIG. 7, which in turn, is derived from the outputs of the shift register in the sequencer circuit 36.

Finally, the outputs from the logic circuit 155 are connected to the output NAND gates 172 and 173, the outputs of which being produced in response to the detection of an actual zero crossing of a specified floating coil, the zero crossing having a transition in a specified, expected direction, i.e., either a negative-to-positive going zero crossing transition or a positive-to-negative going zero crossing transition.

The connections to the output NAND gates 172 and 173 are established with the output of the upper NAND gate 156 and the lower NAND gate 159 connected to the inputs of the output NAND gate 173, and the output of the upper NAND gate 157 and the output of the lower NAND gate 158 connected to the inputs of the output NAND gate 172. The line 170 on which a signal would appear if a positive slope zero crossing is expected is connected to the inputs of the upper NAND gates 156 and 157, and the line 171 on which a signal would appear if a negative slope zero crossing is expected is connected to the inputs of the lower NAND gates 158 and 159. Thus, the upper NAND gates 156 and 157 are responsive the actual occurrence of an expected positive slope zero crossing and the lower NAND gates 158 and 159 are responsive to the actual occurrence of an expected negative slope zero crossing.

Figure 11:
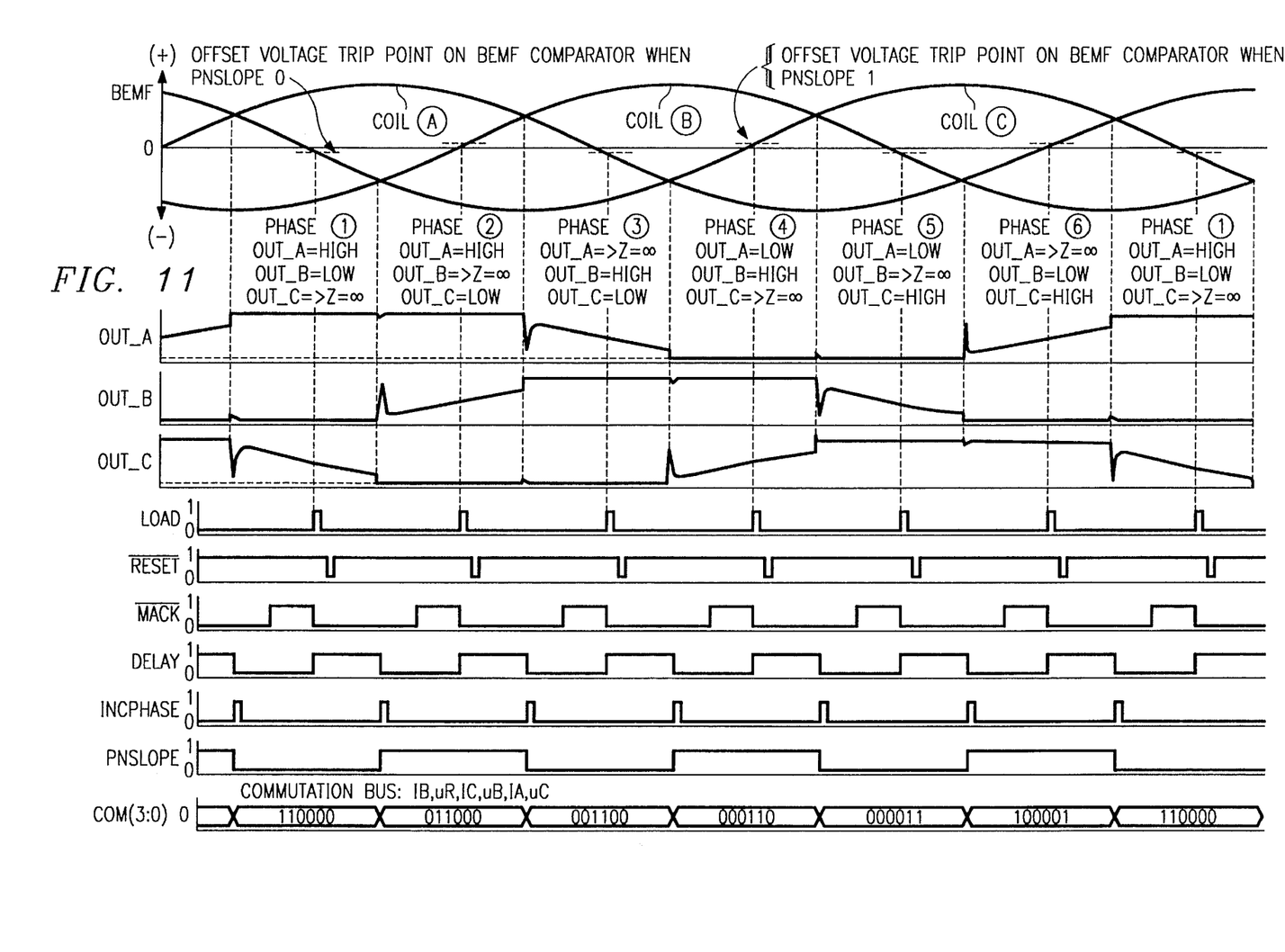
FIG. 11 shows graphs of the various waveforms seen in the circuit of FIG. 6, including the back emf on each stator coil, the output signals from the stator coils, and the various control signals throughout the circuit.

Because of the staged connections at the four stage shift register 148 for each of the positive and negative detection paths, the outputs from the output NAND gates 172 and 173 are two non-overlapping pulses, spaced in time, as shown in FIG. 11 by the curves 179 and 178, respectively, resulting from either a positive-to-negative zero crossing 176 or a negative-to-positive zero crossing 177. Thus, the pulse generated at the output of NAND gate 173 precedes the pulse generated at the output of NAND gate 172 by one clock cycle. The output of the NAND gate 173 on line 174 is used to provide a "load" signal to the counters which measure the required mask and delay time after a phase commutation The output of the NAND gate 172 on line 175 is used to provide a "reset" signal to the period counter.

In accordance with the invention, the motor is braked by changing the position of the flux vector $\vec{B}$ with respect to the position of the poles of the rotor to create a negative torque on the rotor. More particularly, the flux vector $\vec{B}$ is changed from a position leading the poles of the rotor to a position lagging the poles of the rotor. It is noted that the direction of rotation of the flux vector is not changed. This brakes the rotor very quickly compared to the other methods, since changing the position of the flux vector $\vec{B}$ operates on the poles of the rotor in an opposite direction from that which produces positive torque on the rotor. Thus, the rotor slows down much more quickly than, for example, if the rotor were allowed to spin freely and slow down due to frictional forces.

During braking, according to the invention, as the rotor continues to spin forward, a negative torque is applied to slow the motor down, while the commutation sequence is continued to be incremented in the forward direction. To do this, the commutation sequence is instantaneously phase shifted by 180° relative to the positive torque position shown in FIG. 5, by advancing the commutation sequence by three phases. In this manner, after the phase shift has occurred, the floating coil and the sign of the zero crossing slope will not be changed. For instance, as in a normal forward rotation commutation, phase 1 is still indicated by a negative slope on the coil C. The same is true for all the other phases.

Therefore, it is necessary to separate the commutation bus information (uA, 1A, uB, 1B, uC, 1C) used to select the zero crossing from the bus information used to energize the coils. To this extent, the most efficient circuit to accomplish the change over will multiplex the outputs of the sequencer to drive the correct power switches, while allowing the output of the sequencer (before the multiplexer) to select the zero crossing information.

With reference again to FIG. 7, the signal interface circuit 34 is a simple, one signal ("pntorque") method to switch the torque from positive to negative. During negative torque, the current in the coils forms a flux vector $\vec{B}$ that is behind the south pole of the rotor. The south pole is attracted to the flux vector $\vec{B}$ and begins to slow down. The bemf is still being monitored and controls the period, delay, and mask counters so that as the rotor shows down, the commutation also slows down proportionally. In addition, the information used to select the zero crossing must not change.

The final step to consider is the process of switching to the negative torque. Due to the inductance of the coils, the current direction cannot be reversed instantaneously. If the direction of the current were to be reversed abruptly, a large recirculation spike may undesirably be created in the power circuit 32.

Thus, in accordance with the invention, the current in the stator coils A, B, and C is first ramped down in an analog fashion, by reducing $V_{IN}$ on the transconductance circuit. Therefore, while the motor is being spun in normal operation, $V_{IN}$ is first lowered to zero. Next the sense voltage is monitored by the comparator 120, to determine when the current through the sense resistor 112 is zero. Second, the output nodes A, B, and C are monitored by the comparator 125 insure that any recirculating current caused by the sudden ramping down of $V_{IN}$ (essentially floating the lower drivers) has completely disappeared. This is done by insuring that the output voltages on nodes A, B, and C are lower than $V_{cc}$, and that none of the intrinsic diodes are forward biased. Once all of these conditions are met, the "pntorque" signal can be changed from logic 1 (positive torque) to logic "0" (negative torque) in FIG. 7 to brake the rotor.

Figure 12:
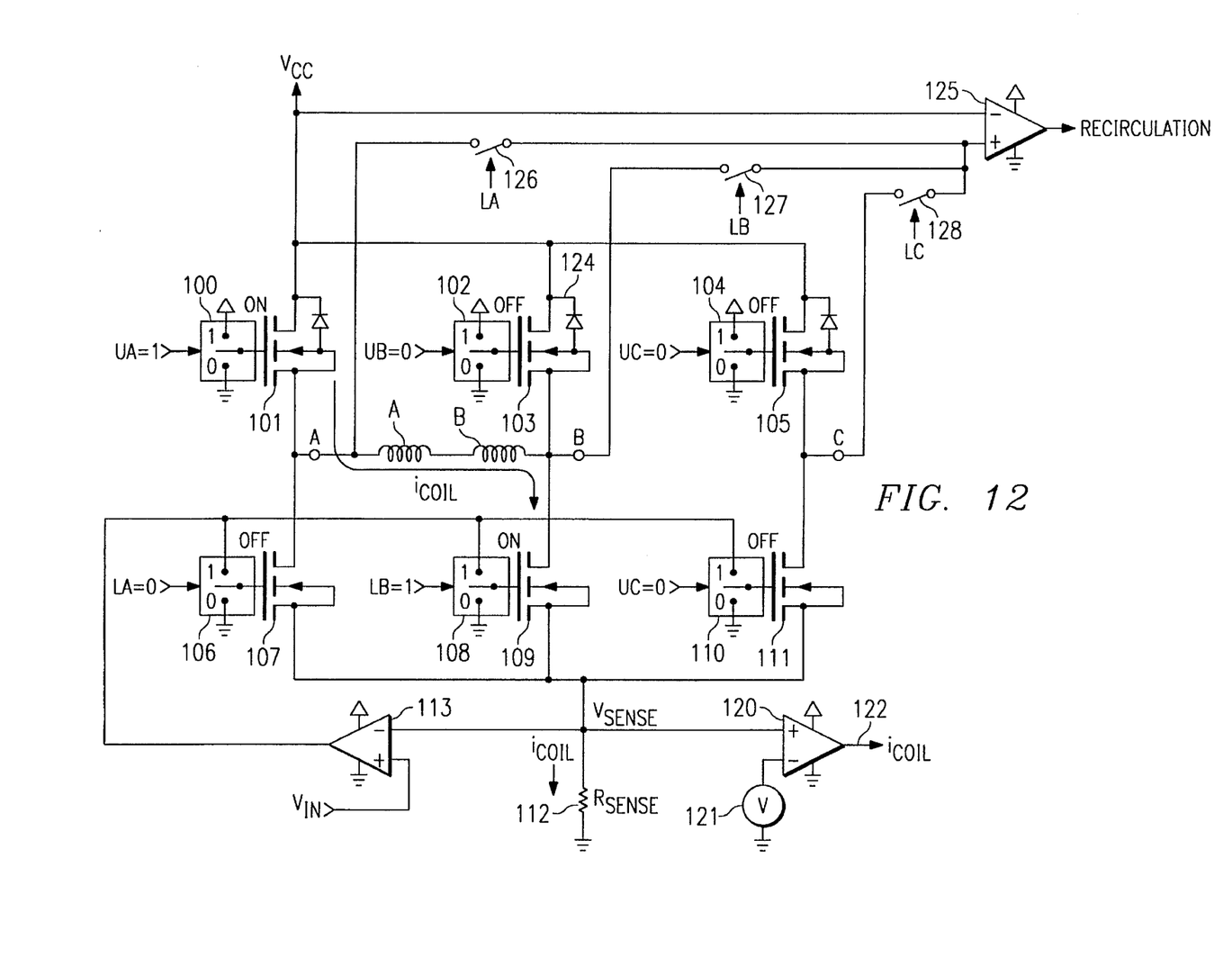
FIG. 12 shows an electrical schematic diagram of the power stage of FIG. 8, showing the current flow through the coils in normal operation.
Figure 13:
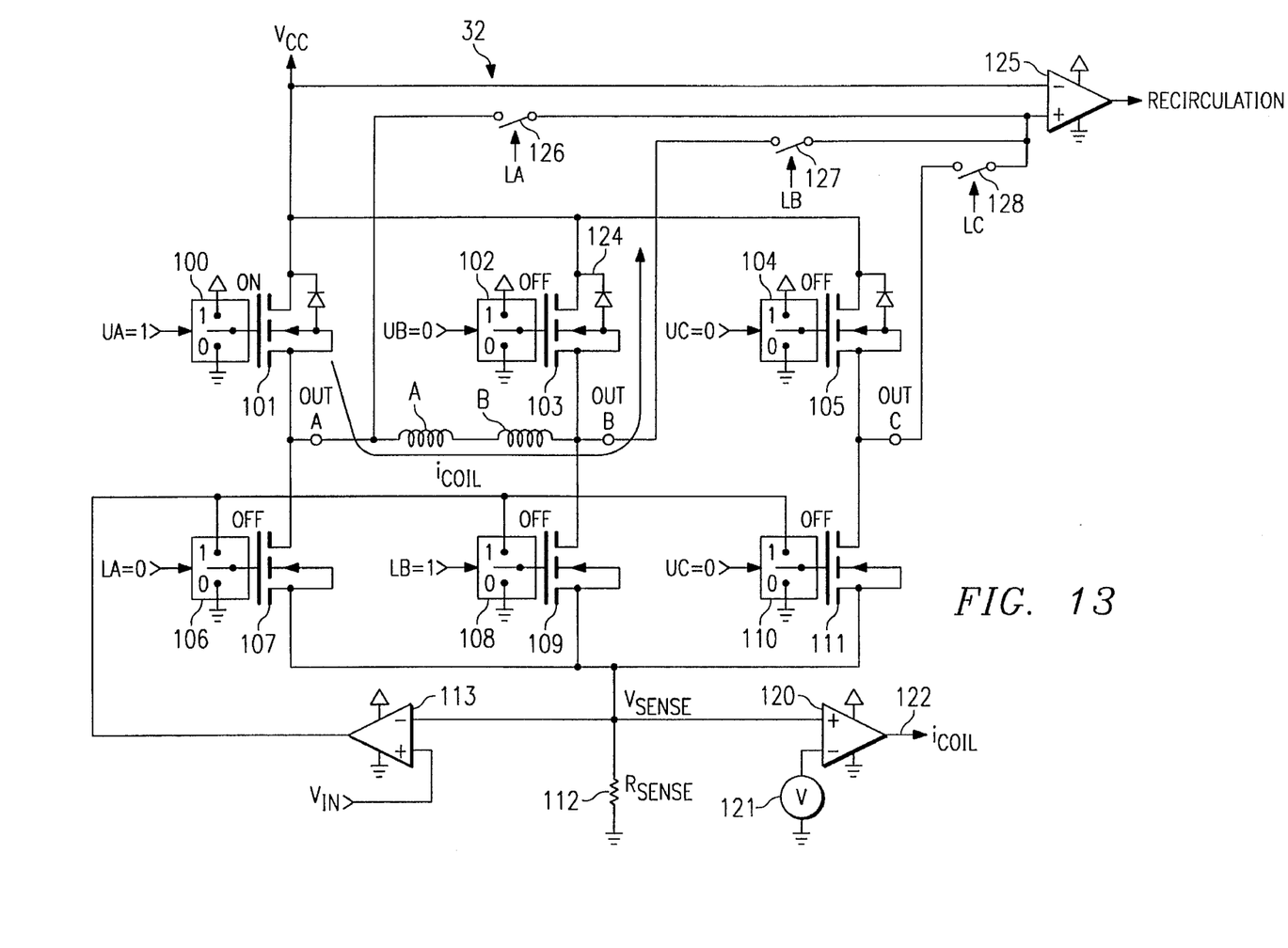
FIG. 13 shows an electrical schematic diagram of the power stage of FIG. 8, showing the current flow through the coils in recirculation operation.

More particularly, consider, for example, the process of changing the torque from positive to negative during the phase 1 commutation cycle. With reference now to FIG. 12, when the rotor is moving in a forward direction and positive torque is applied, current $I_{coil}$ flows through transistors 101 and 109. The current through the sense resistor 112 creates a voltage, $V_{sense}$, that is higher than ground due to the voltage across the sense resistor 112.

First, applying a steep ramp down on $V_{IN}$ will lower the gate voltage on the lower transistor 109 and turn it off. This causes $V_{sense}$ to fall to zero, and the output of the comparator 120 to switch to logic "0", since $V_{sense}$ is lower than reference voltage 121. If, however, the ramp down is not slow enough (i.e. slew rate limited) then the voltage in the coils A and B will raise output B above $V_{cc}$. Since the output on node B is above $V_{cc}$, the intrinsic diode 124 of the transistor 103 will be forward biased. Thus, as shown in FIG. 12, the current $i_{coil}$ flows through the intrinsic diode 124. The signal at terminal lB is still high, so switch 127 is closed. The output of the comparator 125 will be a logic "1" while output of node B is above $V_{cc}$. Once recirculation current is gone, i.e. output at node B is lower than $V_{cc}$, then the output of the comparator 125 becomes a logic "0".

Once these two condition are met, then the "pntorque" signal can be changed without undesirable consequences. After the commutation sequence has been changed to align the flux vector, $V_{IN}$ may be increased to apply the desired amount of negative torque on the rotor. In this manner a smooth transition is achieved, by lowering the positive torque and gradually applying negative torque to slow down the rotor down.

A second method for reversing the torque that can be used when a built in slew rate control is used on the lower drivers is simply to instantaneously switch the rotor into drag brake mode. In this method the outputs are all turned off and tri-stated. Due to the slew rate control, the lower drivers should not go into recirculation at all, and only the sense voltage comparator is needed.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A data storage system, comprising:
   a polyphase DC motor for rotating a data medium, having a rotor and a plurality of stator coils;
   a sequencer for incrementally generating sets of commutation signals to select stator coils for energization to rotate said rotor according to a commutation sequence that increments in a forward direction and generates a flux vector that leads the rotor;
   a power stage to which said commutation signals are applied to energize the selected coils in accordance with said commutation signals;
   a circuit for interrupting the energization of the selected coil;
   a circuit for producing an altered commutation sequence that increments in a forward direction and generates a flux vector that lags the rotor; and
   a circuit for applying the altered commutation sequence to said power stage to brake the rotation of the rotor.

2. The system of claim 1 further comprising a circuit for removing an input voltage from the power stage in response to a signal to brake the rotor, and for reapplying the input voltage after the altered commutation sequence has been applied.

3. The system of claim 2 further comprising:
   a circuit for inhibiting application of said altered commutation sequence until recirculation currents in said power stage caused by the coils in response to the reduction of the input voltage have fallen below a predetermined level.

4. The system of claim 2 further comprising:
   a circuit for inhibiting application of said altered commutation sequence until a voltage on a sense resistor between the power stage and a reference potential has fallen below a predetermined level after an operation of the circuit for interrupting the energization of the selected coils.

5. The system of claim 2 further comprising:
   a circuit for inhibiting application of said altered commutation sequence until recirculation currents in said power stage caused by the coils in response to the reduction of the input voltage have fallen below a predetermined level; and
   a circuit for inhibiting application of said altered commutation sequence until a voltage on a sense resistor between the power stage and a reference potential has fallen below a predetermined level after an operation of the circuit for interrupting the energization of the selected coils.

6. The system of claim 1 wherein said circuit for producing an altered commutation sequence comprises a plurality of multiplexers connected to output the sets of commutation signals in a first order in the absence of a reverse torque signal, and to output the sets of commutation signals in a second order in the presence of a reverse torque signal.

7. The system of claim 1 wherein said altered commutation sequence is 180° out of phase from an original commutation sequence.

8. The system of claim 1 further comprising circuitry for incrementing said sequencer in response to a back emf signal from at least one of said stator coils.

9. A data storage system, comprising:
   a polyphase DC motor for rotating a data medium, having a rotor and a plurality of stator coils;
   a power stage to energize selected ones of the plurality of stator coils;
   a sequencer for incrementally generating sets of commutation signals for application to said power stage to select stator coils for energization to rotate said rotor in a forward direction according to a commutation sequence;
   said commutation signals being selected to create a magnetic flux vector that moves in advance of a pole of said rotor to cause said rotor to rotate in a forward direction;
   a circuit for interrupting the energization of the stator coils;
   a circuit for altering the commutation sequence to produce an altered commutation sequence in the forward direction that creates a flux vector that moves behind the pole of the rotor to apply a negative torque to the rotor; and
   a circuit to adjust a supply voltage to the power stage to control a magnitude of the negative torque applied to the rotor.

10. The system of claim 9 wherein said altered commutation sequence is 180° out of phase from an original commutation sequence.

11. The system of claim 9 further comprising circuitry for incrementing said sequencer in response to a back emf signal from at least one of said stator coils.

12. A data storage system, comprising:

a polyphase DC motor for rotating a data medium, having a rotor and a plurality of stator coils;

a power stage to energize selected ones of the plurality of stator coils;

a sequencer for incrementally generating sets of commutation signals for application to said power stage to select stator coils for energization to rotate said rotor according to a commutation sequence;

said commutation signals being selected to create a magnetic flux vector that moves in advance of a pole of said rotor to cause said rotor to rotate in a forward direction;

a circuit for interrupting the energization of the stator coils;

a circuit for altering the commutation sequence to produce an altered commutation sequence that creates a flux vector that moves behind the pole of the rotor to apply a negative torque to the rotor; and a circuit for reducing an input voltage from the power stage in response to a signal to brake the rotor, and for reapplying the input voltage after the altered commutation sequence has been applied.

13. The system of claim 12 further comprising a circuit to inhibit application of said altered commutation sequence until recirculation currents in said power stage caused by the coils in response to the reduction of the input voltage have fallen below a predetermined level.

14. The system of claim 12 further comprising a circuit to inhibit application of said altered commutation sequence until a voltage on a sense resistor between the power stage and a reference potential has fallen below a predetermined level after an operation of the circuit for interrupting the energization of the stator coils.

15. The system of claim 12 further comprising a circuit to inhibit application of said altered commutation sequence until recirculation currents in said power stage caused by the coils in response to the reduction of the input voltage have fallen below a predetermined level, and further comprising a circuit to inhibit application of said altered commutation sequence until a voltage on a sense resistor between the power stage and a reference potential has fallen below a predetermined level after an operation of the circuit for interrupting the energization of the stator coils.

16. A data storage system comprising:

a polyphase DC motor for rotating a data medium, having a rotor and a plurality of stator coils;

a power stage to energize selected ones of the plurality of stator coils;

a sequencer for incrementally generating sets of commutation signals for application to said power stage to select stator coils for energization to rotate said rotor according to a commutation sequence:

said commutation signals being selected to create a magnetic flux vector that moves in advance of a pole of said rotor to cause said rotor to rotate in a forward direction;

a circuit for interrupting the energization of the stator coils; and a circuit for altering the commutation sequence to produce an altered commutation sequence that creates a flux vector that moves behind the pole of the rotor to apply a negative torque to the rotor, wherein said circuit for altering the commutation sequence to produce an altered commutation sequence comprises a plurality of multiplexers connected to output the sets of commutation signals in a first order in the absence of a reverse torque signal, and to output the sets of commutation signals in a second order in the presence of a reverse torque signal.

17. A data storage system comprising:

a brushless and sensorless DC motor for rotating a data medium, having a rotor and having a stator with at least three coils;

energizing means for energizing said at least three coils in accordance with sequential commutation sequences;

interrupting means for interrupting the energizing of said at least three coils;

monitoring means for monitoring the voltage outputs of said at least three coils after the interrupting means has interrupted the energizing of said at least three coils; and altering means for producing an altered commutation sequence that produces a negative torque on the rotor.

18. The system of claim 17 wherein said energizing means comprises a transconductance circuit.

19. The system of claim 17 further comprising a sequencer for generating the sequential commutation sequence.

20. The system of claim 19 further comprising a multiplexer that is controlled by a brake signal, and wherein the sequencer has six output signals that are connected to the multiplexer, said multiplexer having six outputs that are connected to the energizing means, said multiplexer being connected to output the sets of commutation signals in a first order in the absence of a brake signal, and to output the sets of commutation signals in a second order in the presence of a brake signal.

21. The system of claim 19, further comprising a multiplexer that is controlled by a brake signal output of the altering means;

wherein the sequencer has six output signals that are connected to the multiplexer, said multiplexer having six outputs that are connected to the energizing means, said multiplexer being connected to output the sets of commutation signals in a first order in the absence of a brake signal, and to output the sets of commutation signals in a second order in the presence of a brake signal;

and wherein the multiplexer comprises:

a first transmission gate with an input connected to a sixth output of the sequencer;

a second transmission gate with an input connected to a third output of the sequencer and an output connected to an output of said first transmission gate;

a third transmission gate with an input connected to a first output of the sequencer;

a fourth transmission gate with an input connected to a fourth output of the sequencer and an output connected to an output of said third transmission gate;

a fifth transmission gate with an input connected to the second output of the sequencer;

a sixth transmission gate with an input connected to a fifth output of the sequencer and an output connected to an output of said fifth transmission gate;

a seventh transmission gate with an input connected to the third output of the sequencer;

an eighth transmission gate with an input connected to the sixth output of the sequencer and an output connected to an output of said seventh transmission gate;

a ninth transmission gate with an input connected to the fourth output of the sequencer;

a tenth transmission gate with an input connected to the first output of the sequencer and an output connected to an output of said ninth transmission gate;

an eleventh transmission gate with an input connected to the fifth output of the sequencer;

a twelfth transmission gate with an input connected to the second output of the sequencer and an output connected to an output of said eleventh transmission gate;

an inverter connected to receive the brake signal output, for outputting a signal to a control input of said second transmission gate, a control input of said fourth transmission gate, a control input of said sixth transmission gate, a control input of said eighth transmission gate, a control input of said tenth transmission gate, a control input of said twelfth transmission gate, a complement control input of said first transmission gate, a complement control input of said third transmission gate, a complement control input of said fifth transmission gate, a complement control input of said seventh transmission gate, a complement control input of said ninth transmission gate, and a complement control input of said eleventh transmission gate;

said brake signal output being connected to a complement control input of said second transmission gate, to a complement control input of said fourth transmission gate, to a complement control input of said sixth transmission gate, to a complement control input of said eighth transmission gate, to a complement control input of said tenth transmission gate, to a complement control input of said twelfth transmission gate, to a control input of said first transmission gate, to a control input of said third transmission gate, to a control input of said fifth transmission gate, to a control input of said seventh transmission gate, to a control input of said ninth transmission gate, and to a control input of said eleventh transmission gate.

22. The system of claim 17 wherein said altered commutation sequence is 180° out of phase from an original commutation sequence.

* * * * *